United States Patent
Saito et al.

(10) Patent No.: US 11,274,168 B2
(45) Date of Patent: Mar. 15, 2022

(54) MONOMER COMPOSITION AND METHOD FOR PRODUCING FLUORINATED POLYMER

(71) Applicant: AGC Inc., Chiyoda-ku (JP)

(72) Inventors: Susumu Saito, Chiyoda-ku (JP); Wakako Hashimoto, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 231 days.

(21) Appl. No.: 16/282,377

(22) Filed: Feb. 22, 2019

(65) Prior Publication Data

US 2019/0185600 A1   Jun. 20, 2019

Related U.S. Application Data

(63) Continuation of application No. PCT/JP2017/034770, filed on Sep. 26, 2017.

(30) Foreign Application Priority Data

Sep. 28, 2016 (JP) .............................. JP2016-189905

(51) Int. Cl.
| | |
|---|---|
| C08F 14/18 | (2006.01) |
| C08F 34/02 | (2006.01) |
| H01M 8/1032 | (2016.01) |
| H01M 8/1004 | (2016.01) |
| H01M 4/90 | (2006.01) |
| H01M 8/1027 | (2016.01) |
| H01M 8/10 | (2016.01) |
| C08F 214/26 | (2006.01) |
| C08F 216/14 | (2006.01) |
| C08F 234/02 | (2006.01) |
| C08F 134/02 | (2006.01) |
| C08F 214/18 | (2006.01) |
| C08F 114/18 | (2006.01) |

(52) U.S. Cl.
CPC ............ C08F 34/02 (2013.01); C08F 14/185 (2013.01); H01M 4/9008 (2013.01); H01M 8/1004 (2013.01); H01M 8/1027 (2013.01); H01M 8/1032 (2013.01); *C08F 114/185* (2013.01); *C08F 134/02* (2013.01); *C08F 214/182* (2013.01); *C08F 214/262* (2013.01); *C08F 216/1466* (2013.01); *C08F 216/1475* (2020.02); *C08F 234/02* (2013.01); *C08F 2800/20* (2013.01); *H01M 2008/1095* (2013.01); *H01M 2300/0082* (2013.01)

(58) Field of Classification Search
CPC .......... C08F 216/1466; C08F 216/1475; C08F 14/185; C08F 14/18; C08F 114/185; C08F 114/18; C08F 114/214; C08F 114/182; C08F 34/02; C08F 134/02; C08F 234/02

See application file for complete search history.

(56) References Cited

U.S. PATENT DOCUMENTS

| | | | |
|---|---|---|---|
| 5,652,147 A | 7/1997 | Kawamura et al. | |
| 2006/0281946 A1* | 12/2006 | Morita | C08F 14/18 562/586 |
| 2010/0093930 A1* | 4/2010 | Guo | C09J 175/16 524/832 |
| 2016/0325493 A1 | 11/2016 | Desimone et al. | |

FOREIGN PATENT DOCUMENTS

| | | | |
|---|---|---|---|
| JP | 2013075861 A * | 4/2013 | |
| JP | 5609874 B2 | 10/2014 | |
| JP | 5807493 B2 | 11/2015 | |
| JP | 5807494 B2 | 11/2015 | |
| JP | 2016-509962 | 4/2016 | |
| JP | 2016-509963 | 4/2016 | |
| JP | 2017-165927 | 9/2017 | |
| JP | 6423801 B2 | 11/2018 | |
| WO | WO 95/08762 A1 | 3/1995 | |
| WO | WO 2009/003165 A1 | 12/2008 | |
| WO | WO 2014/175123 A1 | 10/2014 | |
| WO | WO 2015/080888 A2 | 6/2015 | |

OTHER PUBLICATIONS

International Search Report dated Jan. 9, 2018 in PCT/JP2017/034770 filed Sep. 26, 2017 (with English Translation).

* cited by examiner

*Primary Examiner* — Ling Siu Choi
*Assistant Examiner* — David L Miller
(74) *Attorney, Agent, or Firm* — Element IP, PLC

(57) ABSTRACT

To provide a monomer composition in which the solubility of the polymerization inhibitor in the cyclic monomer is good, the stability of the cyclic monomer during storage is good, and the cyclic monomer and the polymerization inhibitor are easily separated by distillation; and a method for producing a high molecular weight fluorinated polymer from the monomer composition.

A monomer composition which comprises a specific cyclic monomer and a polymerization inhibitor, wherein the polymerization inhibitor is a polymerization inhibitor which satisfies (a) it is a 6-membered unsaturated cyclic hydrocarbon having from 1 to 4 substituents, (b) it has, as the substituent, at least one type selected from the group consisting of a t-butyl group, a methyl group, an isopropenyl group, an oxo group and a hydroxy group, (c) in a case where it has an oxo group as one type of the substituent, it has, as the substituent other than the oxo group, either one or both of a t-butyl group and a methyl group, and (d) in a case where it has a hydroxy group as the substituent, the number of the hydroxy group is only one.

13 Claims, No Drawings

MONOMER COMPOSITION AND METHOD FOR PRODUCING FLUORINATED POLYMER

TECHNICAL FIELD

The present invention relates to a monomer composition and a method for producing a fluorinated polymer.

BACKGROUND ART

As an electrolyte material to be contained in a catalyst layer or a polymer electrolyte membrane of a membrane/electrode assembly for a polymer electrolyte fuel cell, a fluorinated polymer having a cyclic structure and having ion exchange groups has been proposed, in view of excellent power generation characteristics of the obtainable membrane/electrode assembly (for example, Patent Documents 1 and 2).

A fluorinated polymer having a cyclic structure is obtained by polymerizing a monomer component containing a cyclic monomer.

Since a cyclic monomer has high polymerizability, a polymerization inhibitor is added during its storage. For example, it is disclosed that a polymerization inhibitor such as a compound represented by the following formula (i'-1) is added to a cyclic monomer represented by the following formula (m14) (Patent Documents 3 and 4).

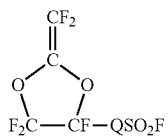
(m14)

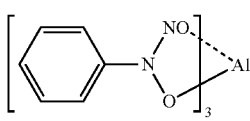
(i'-1)

wherein Q is a single bond, a perfluoroalkylene group or a group having an etheric oxygen atom in a carbon-carbon bond of a perfluoroalkylene group.

PRIOR ART DOCUMENTS

Patent Documents

Patent Document 1: WO2014/175123
Patent Document 2: Japanese Patent No. 5609874
Patent Document 3: Japanese Patent No. 5807493
Patent Document 4: Japanese Patent No. 5807494

DISCLOSURE OF INVENTION

Technical Problem

However, if a polymerization inhibitor such as the compound represented by the formula (i'-1) is added to a cyclic monomer other than the compound represented by the formula (m14), for example, a compound represented by the after-described formula (m11), a compound represented by the formula (m12) or a compound represented by the formula (m13), one or more of the following problems may arise.

The solubility of the polymerization inhibitor in the cyclic monomer is poor.

The stability of the cyclic monomer during storage is poor.

The cyclic monomer and the polymerization inhibitor are hardly separated by distillation. If the polymerization inhibitor remains in a large amount in the cyclic monomer, a high molecular weight fluorinated polymer cannot be obtained.

The present invention provides a monomer composition in which the solubility of the polymerization inhibitor in the cyclic monomer is good, the stability of the cyclic monomer during storage is good, and the cyclic monomer and the polymerization inhibitor are easily separated by distillation; and a method for producing a fluorinated polymer capable of obtaining a high molecular weight fluorinated polymer.

Solution to Problem

The present invention has the following embodiments.

<1> A monomer composition comprising a cyclic monomer and a polymerization inhibitor, the cyclic monomer being at least one monomer selected from the group consisting of a compound represented by the following formula (m11), a compound represented by the following formula (m12) and a compound represented by the following formula (m13), and the polymerization inhibitor being a polymerization inhibitor which satisfies the following requirements (a) to (d):

(a) it is a 6-membered unsaturated cyclic hydrocarbon having from 1 to 4 substituents, (b) it has, as the substituent, at least one type selected from the group consisting of a t-butyl group, a methyl group, an isopropenyl group, an oxo group and a hydroxy group, (c) in a case where it has an oxo group as one type of the substituent, it has, as the substituent other than the oxo group, either one or both of a t-butyl group and a methyl group, and (d) in a case where it has a hydroxy group as the substituent, the number of the hydroxy group is only one;

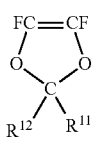
(m11)

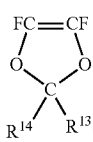
(m12)

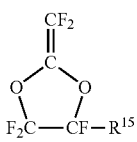
(m13)

wherein $R^{11}$, $R^{12}$, $R^{14}$ and $R^{15}$ are each independently a fluorine atom, a $C_{1-10}$ perfluoroalkyl group or a group having an etheric oxygen atom in a carbon-carbon bond of a $C_{2-10}$ perfluoroalkyl group, and $R^{13}$ is a single bond, a $C_{1-10}$ perfluoroalkylene group or a group having an etheric oxygen atom in a carbon-carbon bond of a $C_{2-10}$ perfluoroalkylene group.

<2> The monomer composition according to the above <1>, wherein the proportion of the cyclic monomer is from 90 to 99.99 mass % based on the total amount of the monomer composition.

<3> The monomer composition according to the above <1> or <2>, wherein the proportion of the polymerization inhibitor is from 0.01 to 10 mass % based on the total amount of the monomer composition.

<4> The monomer composition according to any one of the above <1> to <3>, wherein the cyclic monomer is the compound represented by the formula (m11) or the compound represented by the formula (m12).

<5> The monomer composition according to any one of the above <1> to <4>, wherein the compound represented by the formula (m11) is a compound represented by the after-described formula (m11-1), a compound represented by the after-described formula (m11-2) or a compound represented by the after-described formula (m11-3).

<6> The monomer composition according to any one of the above <1> to <4>, wherein the compound represented by the formula (m12) is a compound represented by the after-described formula (m12-1) or a compound represented by the after-described formula (m12-2).

<7> The monomer composition according to any one of the above <1> to <3>, wherein the compound represented by the formula (m13) is a compound represented by the after-described formula (m13-1) or a compound represented by the after-described formula (m13-2).

<8> The monomer composition according to any one of the above <1> to <7>, wherein the polymerization inhibitor is at least one polymerization inhibitor selected from the group consisting of a compound represented by the after-described formula (i-1), a compound represented by the after-described formula (i-2), a compound represented by the after-described formula (i-3) and a compound represented by the after-described formula (i-4).

<9> The monomer composition according to the above <4>, wherein the polymerization inhibitor is at least one polymerization inhibitor selected from the group consisting of the compound represented by the formula (i-1), the compound represented by the formula (i-2) and the compound represented by the formula (i-3).

<10> A method for producing a fluorinated polymer, which comprises distilling the monomer composition as defined in any one of the above <1> to <9> to separate the cyclic monomer, and polymerizing a monomer component containing the cyclic monomer.

<11> The method for producing a fluorinated polymer according to the above <10>, wherein the monomer composition is distilled by simple distillation, simple distillation with packed column, or purification distillation.

<12> The method for producing a fluorinated polymer according to the above <10> or <11>, wherein the fluorinated polymer is an electrolyte material to be contained in a polymer electrolyte membrane or a catalyst layer of a membrane/electrode assembly for a polymer electrolyte fuel cell.

Advantageous Effects of Invention

The monomer composition of the present invention is such that the solubility of the polymerization inhibitor in the cyclic monomer is good, the stability of the cyclic monomer during storage is good, and the cyclic monomer and the polymerization inhibitor are easily separated by distillation. Further, according to the method for producing a fluorinated polymer of the present invention, a high molecular weight fluorinated polymer can be obtained.

DESCRIPTION OF EMBODIMENTS

In this specification, the following definition of terms and the manner of description are applied.

A compound represented by the formula (m11) will also be referred to as compound (m11) and the same applies to compounds represented by other formulae.

A "unit" means an atomic group based on a monomer formed by polymerization of the monomer. The unit means an atomic group directly formed by a polymerization reaction of a monomer and an atomic group having a part of the unit converted to another structure by treating the polymer.

An "ion exchange group" means a group in which a part of cation contained in the group is exchangeable with other cation, such as a sulfonic acid group, a sulfonimide group, a sulfonmethide group or a carboxylic acid group.

A "sulfonic acid group" means $—SO_3^-H^+$ and/or $—SO_3^-M^+$ (wherein $M^+$ is a monovalent metal ion, or an ammonium ion in which at least one hydrogen atom may be substituted with a hydrocarbon group).

The expression "to" to represent a numerical range is used to include the numerical values before and after it as the lower limit value and the upper limit value.

The "TQ value" is an index of a molecular weight and a softening temperature of a polymer. A higher TQ value means a higher molecular weight. It is a temperature at which the extrusion rate of a polymer becomes 100 mm³/sec, when the polymer is subjected to melt-extrusion under an extrusion pressure condition of 2.94 MPa from a nozzle having a length of 1 mm and an inner diameter of 1 mm.

<Monomer Composition>

The monomer composition of the present invention comprises a specific cyclic monomer and a specific polymerization inhibitor.

The monomer composition of the present invention may contain, as the case requires, other components such as other monomer, other polymerization inhibitor and impurities inevitable in production of the cyclic monomer.

The specific cyclic monomer is at least one monomer selected from the group consisting of compounds (m11), compound (m12) and compound (m13). The cyclic monomer is preferably compound (m11) or compound (m12) in view of favorable power generation characteristics of a fuel cell. In view of easy preparation of the monomer, the cyclic monomer is preferably compound (m11) or compound (m13).

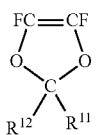

(m11)

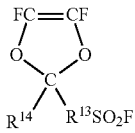

(m12)

(m13)

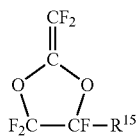

$R^{11}$ is as defined above. The perfluoroalkyl group in the above definition may be linear or branched, and is preferably linear. $R^{11}$ is preferably a $C_{1-5}$ perfluoroalkyl group, more preferably a trifluoromethyl group.

$R^{12}$ and $R^{14}$ are as defined above. The perfluoroalkyl group in the above definition may be linear or branched, and is preferably linear. $R^{12}$ and $R^{14}$ are preferably each independently a trifluoromethyl group.

$R^{13}$ is as defined above. The perfluoroalkylene group in the above definition may be linear or branched, and is preferably linear. $R^{13}$ is preferably a $C_{2-4}$ perfluoroalkylene group or a group having an etheric oxygen atom in a carbon-carbon bond of a $C_{3-4}$ perfluoroalkylene group.

$R^{15}$ is as defined above. The perfluoroalkyl group in the above definition may be linear or branched, and is preferably linear. $R^{15}$ is preferably a $C_{1-4}$ perfluoroalkyl group or a group having an etheric oxygen atom in a carbon-carbon bond of a $C_{2-4}$ perfluoroalkyl group, more preferably a $C_{1-4}$ perfluoroalkyl group, further preferably a trifluoromethyl group.

As the compound (m11), for example, compounds (m11-1) to (m11-6) may be mentioned. In view of a high ion exchange capacity due to a low molecular weight and monomer recovery property due to a low boiling point, preferred is compound (m11-1), (m11-2) or (m11-3), more preferred is compound (m11-1).

(m11-1)

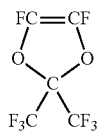

(m11-2)

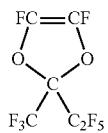

(m11-3)

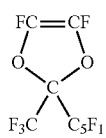

(m11-4)

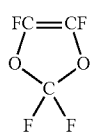

(m11-5)

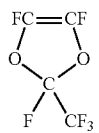

(m11-6)

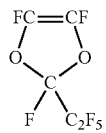

As the compound (m12), for example, compounds (m12-1) and (m12-2) may be mentioned.

(m12-1)

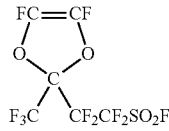

(m12-2)

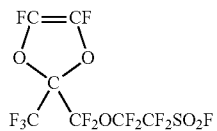

As the compound (m13), for example, compounds (m13-1) and (m13-2) may be mentioned. In view of a high ion exchange capacity due to a low molecular weight and monomer recovery property due to a low boiling point, preferred is compound (m13-1).

(m13-1)

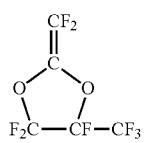

(m13-2)

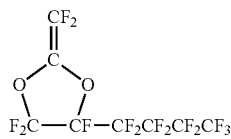

The compound (m11) may be prepared by a method as disclosed in e.g. Macromolecule, Vol. 26, No. 22, 1993, p. 5829 to 5834, or JP-A-H6-92957.

The compound (m12) may be prepared by a method as disclosed in e.g. JP-A-2006-152249.

The compound (m13) may be prepared by a method as disclosed in e.g. WO2000/056694, or Izvestiya Akademii Nauk SSSR, Seriya Khimicheskaya, 1989, Vol. 4, p. 938 to 942.

The specific polymerization inhibitor is a polymerization inhibitor which satisfies the above requirements (a) to (d). Particularly, it is preferably one which satisfies the following (a') to (d').

(a') It is a 6-membered unsaturated cyclic hydrocarbon having 3 or 4 substituents.

(b') It has, as the substituent, at least one member selected from the group consisting of a t-butyl group, a methyl group, an oxo group (=O) and a hydroxy group.

(c') In a case where it has an oxo group as one type of the substituent, it has, as the substituent other than the oxo group, a t-butyl group.

(d') In a case where it has a hydroxy group as the substituent, the number of the hydroxy group is only one, and as the substituent other than the hydroxy group, it has a t-butyl group, a methyl group or both of a t-butyl group and a methyl group.

The polymerization inhibitor which satisfies the requirements (a) to (d) may, for example, be 2-t-butyl-1,4-benzoquinone (compound (i-1)), 6-t-butyl-2,4-xylenol (compound (i-2)), 2,6-di-t-butyl-p-cresol (compound (i-3)), p-mentha-1,8-diene (compound (i-4)), 2,5-di-t-butyl-1,4-benzoqhinone (compound (i-5)) or 2,6-di-t-butyl-1,4-benzoquinone (compound (i-6)).

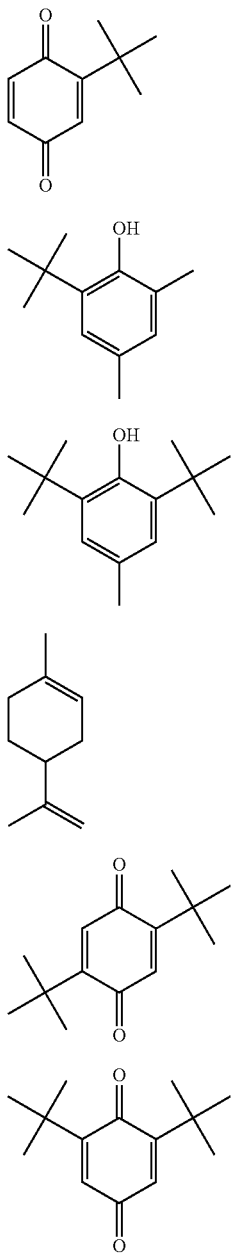

The polymerization inhibitor is, in view of favorable storage stability of the cyclic monomer, in view of favorable solubility in the cyclic monomer, and in view of favorable separation property from the cyclic monomer, preferably at least one member selected from the group consisting of compound (i-1), compound (i-2), compound (i-3) and compound (i-4), more preferably at least one member selected from the group consisting of compound (i-1), compound (i-2) and compound (i-3).

The proportion (content) of the cyclic monomer is preferably from 90 to 99.99 mass %, more preferably from 95 to 99.95 mass %, further preferably from 98 to 99.95 mass % based on the total amount of the monomer composition. When the ratio is at least the lower limit value of the above range, a high molecular weight fluorinated polymer can be prepared. When the ratio is at most the upper limit value of the above range, effects by other components are less likely to be impaired.

The proportion (content) of the polymerization inhibitor is preferably from 0.01 to 10 mass %, more preferably from 0.05 to 5 mass %, further preferably from 0.05 to 2 mass %, based on the entire amount of the monomer composition. When the proportion is at least the lower limit value of the above range, excellent stability of the cyclic monomer during storage will be obtained. When the proportion is at most the upper limit value of the above range, excellent solubility of the polymerization inhibitor in the cyclic monomer will be obtained.

The proportion (content) of other components is preferably from 0 to 9.99 mass %, more preferably from 0 to 4.95 mass %, further preferably 0 mass % to the total amount of the monomer composition.

Since the above-described monomer composition of the present invention comprises a polymerization inhibitor which satisfies the requirements (a) to (d), the solubility of the polymerization inhibitor in the cyclic monomer is good, the stability of the cyclic monomer during storage is good, and the cyclic monomer and the polymerization inhibitor are easily separated by distillation. That is, a polymerization inhibitor having, as a substituent, two or more hydroxy groups, a condensed ring or the like, has a too high polarity, and is thereby hardly soluble in the cyclic monomer, whereas the polymerization inhibitor which satisfies the requirements (a) to (d), which has polarity such that it is highly compatible with the cyclic monomer, is well soluble in the cyclic monomer. Since the polymerization inhibitor which satisfies the requirements (a) to (d) is likely to be present uniformly in the system, polymerization of the cyclic monomer is efficiently suppressed, and the stability of the cyclic monomer during storage tends to be good. The polymerization inhibitor which satisfies the requirements (a) to (d) has a higher molecular weight corresponding to the substituent, and further in a case where it has an oxo group or a hydroxy group, it has a high boiling point by influences such as chemical interaction of the hydrogen bond, etc., and the difference with the boiling point of the cyclic monomer is thereby large, and accordingly the polymerization inhibitor is easily separated from the cyclic monomer by distillation.

<Method for Producing Fluorinated Polymer>

The method for producing a fluorinated polymer of the present invention is a method of distilling the monomer composition of the present invention to separate the cyclic monomer, and polymerizing a monomer component containing the cyclic monomer.

As the method for producing a fluorinated polymer, for example, a method may be mentioned in which the monomer composition is distilled to separate the cyclic monomer and the polymerization inhibitor, a monomer component containing the cyclic monomer is polymerized in the presence of a polymerization initiator to obtain a mixture containing a fluorinated polymer and an unreacted cyclic monomer, the cyclic monomer is recovered from the mixture to obtain the fluorinated polymer, and as the case requires, the fluorinated polymer is washed with a washing medium.

As a method of distilling the monomer composition, known distillation method such as simple distillation, simple distillation with distillation column or purification distillation may be mentioned. The temperature, the pressure, etc. at the time of distillation may be properly set depending upon e.g. the boiling points of the cyclic monomer and the polymerization inhibitor.

As the monomer component in production of the fluorinated polymer, the cyclic monomer separated from the monomer composition by distillation may be used as it is, or a mixture of the cyclic monomer and other monomer may be used.

The monomer component contains the above-described specific cyclic monomer. The monomer component may contain, as the case requires, the after-mentioned other cyclic monomer, a monomer having a —SO$_2$F group and having no cyclic structure, or the after-described other monomer. Other cyclic monomer is preferably a monomer having a —SO$_2$F group and having a cyclic structure.

The monomer component preferably contains either one or both of a monomer having a —SO$_2$F group and having a cyclic structure and a monomer having a —SO$_2$F group and having no cyclic structure, since the obtainable fluorinated polymer is used as a precursor of an electrolyte material to be contained in a catalyst layer or a polymer electrolyte membrane of a membrane/electrode assembly.

Other cyclic monomer is preferably a monomer having a —SO$_2$F group and having a cyclic structure. For example, compound (m14) may be mentioned.

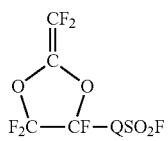

(m14)

In the formula (m14), Q is a single bond, a C$_{1-10}$ perfluoroalkylene group or a group having an etheric oxygen atom in a carbon-carbon bond of a C$_{2-10}$ perfluoroalkylene group. The perfluoroalkylene group may be linear or branched, and is preferably linear. Q is preferably a C$_{2-4}$ perfluoroalkylene group or a group having an etheric oxygen atom in a carbon-carbon bond of a C$_{3-4}$ perfluoroalkylene group.

As the compound (m14), for example, compounds (m14-1) to (m14-3) may be mentioned.

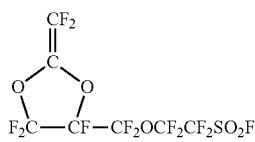

(m14-1)

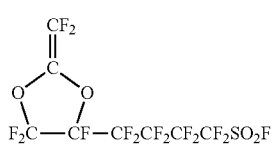

(m14-2)

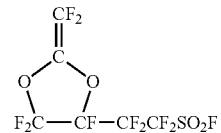

(m14-3)

The compound (m14) may be prepared by a method as disclosed in e.g. WO2003/037885, JP-A-2005-314388 or JP-A-2009-040909.

As the monomer having a —SO$_2$F group and having no cyclic structure, for example, compounds (m21), (m22) and (m23) may be mentioned.

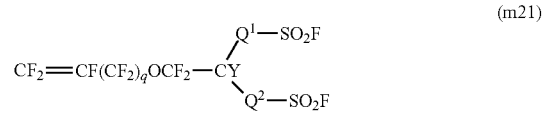

(m21)

(m22)

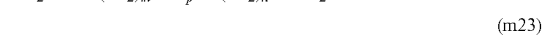

(m23)

In the formula (m21), q is 0 or 1. Y is a fluorine atom or a monovalent perfluoroorganic group. Y is preferably a fluorine atom or a C$_{1-6}$ linear perfluoroalkyl group which may have an etheric oxygen atom.

Q$^1$ is a perfluoroalkylene group which may have an etheric oxygen atom.

Q$^2$ is a single bond or a perfluoroalkylene group which may have an etheric oxygen atom.

When the perfluoroalkylene group for Q$^1$ or Q$^2$ has an etheric oxygen atom, the number of such oxygen atom may be one or may be two or more. Further, such oxygen atom may be inserted in a carbon atom-carbon atom bond of the perfluoroalkylene group, or may be inserted in the carbon atom bond terminal, but is not inserted to the terminal directly bonded to a sulfur atom.

The perfluoroalkylene group may be linear or branched, and is preferably linear.

The number of carbon atoms in the perfluoroalkylene group is preferably from 1 to 6, more preferably from 1 to 4. When the number of carbon atoms is at most 6, the boiling point of the raw material compound will be low, whereby purification by distillation becomes easy. Further, when the number of carbon atoms is at most 6, it is possible to prevent a decrease in the ion exchange capacity of the fluorinated polymer, and to prevent a decrease in the proton conductivity.

Q$^2$ is preferably a C$_{1-6}$ perfluoroalkylene group which may have an etheric oxygen atom. When Q$^2$ is a C$_{1-6}$ perfluoroalkylene group which may have an etheric oxygen atom, the stability of the power generation performance will be excellent when a polymer electrolyte fuel cell is operated over a long period of time, as compared with a case where Q$^2$ is a single bond.

It is preferred that at least one of Q$^1$ and Q$^2$ is a C$_{1-6}$ perfluoroalkylene group having an etheric oxygen atom. The monomer having a C$_{1-6}$ perfluoroalkylene group having an etheric oxygen atom, can be prepared without via a fluorination reaction with fluorine gas, whereby the yield is good, and the production is easy.

In the formula (m22), m is 0 or 1, and m is 0 when p is 0. p is 0 or 1. n is an integer of from 1 to 12.

In the formula (m23), X is a fluorine atom or a trifluoromethyl group. r is an integer of from 1 to 3. t is 0 or 1. s is an integer of from 1 to 12.

As the compound (m21), in view of easy production of a fluorinated polymer and in view of easy industrial application, preferred are compounds (m21-1) to (21-3), more preferred is compound (m21-1).

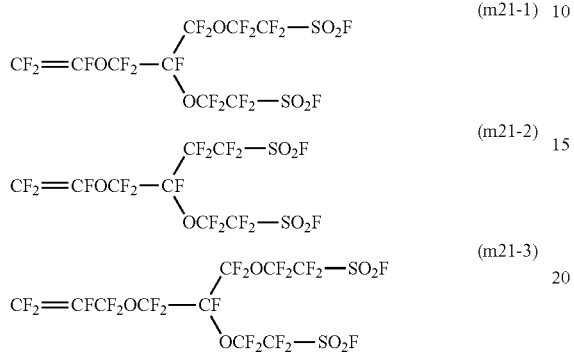

As the compound (m22), preferred is the following compound (m22-1) or (m22-2).

$$CF_2\!=\!CF\!-\!CF_2\!-\!O\!-\!CF_2CF_2\!-\!SO_2F \qquad (m22\text{-}1)$$

$$CF_2\!=\!CF\!-\!O\!-\!CF_2CF_2\!-\!SO_2F \qquad (m22\text{-}2)$$

As the compound (m23), preferred is the following compound (m23-1).

$$CF_2\!=\!CF\!-\!OCF_2CF(CF_3)\!-\!O\!-\!CF_2CF_2\!-\!SO_2F \qquad (m23\text{-}1)$$

The compound (m21) may be prepared by a method disclosed in e.g. WO2007/013533 or JP-A-2008-202039.

The compounds (m22) and (m23) may be prepared, for example, by a known preparation method such as a method as disclosed in D. J. Vaugham, "Du Pont Innovation", Vol. 43, No. 3, 1973, p. 10 or a method as disclosed in Examples of U.S. Pat. No. 4,358,412.

Other monomer may, for example, be tetrafluoroethylene (hereinafter sometimes referred to as TFE), chlorotrifluoroethylene, trifluoroethylene, vinylidene fluoride, vinyl fluoride, ethylene, propylene, perfluoro(3-butenyl vinyl ether), perfluoro(allyl vinyl ether), a perfluoro α-olefin (such as hexafluoropropylene), a (perfluoroalkyl)ethylene (such as (perfluorobutyl)ethylene), a (perfluoroalkyl)propene (such as 3-perfluorooctyl-1-propene) or a perfluoro(alkyl vinyl ether). As other monomer, TFE is preferred. TFE, which has high crystallinity, has an effect to suppress swelling when the fluorinated polymer contains water, and can reduce the moisture content of the fluorinated polymer.

As the polymerization method, a polymerization method such as an emulsion polymerization method, a solution polymerization method, a suspension polymerization method or a bulk polymerization method may be employed. As the polymerization method, a solution polymerization method is preferred.

In the case of the solution polymerization method, in a reactor, a monomer component is polymerized in a polymerization medium in the presence of a polymerization initiator to obtain a mixture containing a fluorinated polymer, an unreacted cyclic monomer and the polymerization medium.

The polymerization medium is preferably a solvent such as a chlorofluorocarbon, a hydrochlorofluorocarbon, a hydrofluorocarbon or a hydrofluoroether, more preferably a hydrofluorocarbon or a hydrofluoroether which has no influence on the ozone layer.

The polymerization initiator may, for example, be a diacyl peroxide (such as disuccinic acid peroxide, benzoyl peroxide, perfluorobenzoyl peroxide, lauroyl peroxide or bis(pentafluoropropionyl) peroxide), an azo compound (such as 2,2'-azobis(2-amidinopropane) hydrochloride, 4,4'-azobis(4-cyanovaleric acid), dimethyl 2,2'-azobisisobutyrate or azobisisobutyronitrile), a peroxyester (such as t-butyl peroxyisobutyrate or t-butyl peroxypivalate), a peroxydicarbonate (such as diisopropyl peroxydicarbonate or bis(2-ethylhexyl) peroxydicarbonate) a hydroperoxide (such as diisopropylbenzene hydroperoxide or t-butyl hydroperoxide) or a dialkyl peroxide (such as di-t-butyl peroxide or perfluoro-di-t-butyl peroxide).

The amount of the polymerization initiator is preferably from 0.0001 to 3 parts by mass, more preferably from 0.0001 to 2 parts by mass based on the total amount of the monomer component. In addition to the polymerization initiator, e.g. a molecular weight modifier commonly used for solution polymerization may be added.

The molecular weight modifier may be an alcohol (such as methanol, ethanol, 2,2,2-trifluoroethanol, 2,2,3,3-tetrafluoropropanol, 1,1,1,3,3,3-hexafluoroisopropanol or 2,2,3,3,3-pentafluoropropanol), a hydrocarbon (such as n-pentane, n-hexane or cyclohexane), a hydrofluorocarbon (such as $CF_2H_2$), a ketone (such as acetone), a mercaptan (such as methyl mercaptan), an ester (such as methyl acetate or ethyl acetate) or an ether (such as diethyl ether or methyl ethyl ether).

The amount of the molecular weight modifier is preferably from 0.0001 to 50 parts by mass, more preferably from 0.001 to 10 parts by mass based on the total amount of the monomer component.

The proportions of the respective monomers charged in the monomer component are set so that the proportions of units in the obtained fluorinated polymer will be desired proportions.

The monomers may be charged all at once, or may be charged continuously or intermittently.

As the polymerization temperature, an optimum value is set depending upon the types and the charge proportions of the monomers, etc., and the polymerization temperature is preferably from 10 to 150° C., which is suitable for industrial application. The polymerization pressure (gauge pressure) is preferably from 0.1 to 5.0 MPa, which is suitable for industrial application.

In the case of a solution polymerization method, as the case requires, the cyclic monomer is recovered from the mixture by a known method, and the obtained fluorinated polymer solution is mixed with an aggregation medium to obtain a fluorinated polymer. Then, as the case requires, the fluorinated polymer is washed with a washing medium. The washing medium and the washing method are not particularly limited, and a known method may be employed.

The fluorinated polymer obtained by the production method of the present invention has units based on the above-described specific cyclic monomer. The fluorinated polymer may further have, as the case requires, units based on the above-described other cyclic monomer, units based on a monomer having a $-SO_2F$ group and having no cyclic structure and units based on other monomer. As structural units based on other cyclic monomer, preferred are units based on the monomer having a $-SO_2F$ group and having a cyclic structure.

The fluorinated polymer preferably has either one or both of units based on a monomer having a cyclic structure and having a —SO₂F group and units based on a monomer having a —SO₂F group and having no cyclic structure, since the fluorinated polymer is used as a precursor of an electrolyte material to be contained in a catalyst layer of membrane/electrode assembly.

After the —SO₂F groups are converted to ion exchange groups, the ion exchange capacity of the fluorinated polymer is preferably from 0.5 to 2.5 meq/g dry resin, more preferably from 1.0 to 2.0 meq/g dry resin. When the ion exchange capacity is at least the lower limit value of the above range, electrical conductivity of the fluorinated polymer after converting the —SO₂F groups to ion exchange groups is high, whereby a sufficient cell output can be obtained when the fluorinated polymer is used for a catalyst layer of a membrane/electrode assembly. When the ion exchange capacity is at most the upper limit value of the above range, such a fluorinated polymer can easily be produced.

The TQ value of the fluorinated polymer is preferably from 230 to 320° C., more preferably from 250 to 300° C. When the TQ value is at least the lower limit value of the above range, the fluorinated polymer tends to have favorable mechanical strength and hot water resistance. When the TQ value is at most the upper limit value of the above range, such a polymer is easily formed, and after the —SO₂F groups are converted to ion exchange groups, a liquid composition of the fluorinated polymer is likely to be obtained.

A fluorinated polymer having a cyclic structure and having ion exchange groups may be produced by converting —SO₂F groups of a fluorinated polymer having a cyclic structure and having —SO₂F groups to ion exchange groups (such as sulfonic acid groups or sulfonimide groups).

As a method of converting —SO₂F groups to ion exchange groups, the method disclosed in WO2011/013578 may be mentioned. For example, to convert —SO₂F groups to acid-form sulfonic acid groups (—SO₃⁻H⁺ groups), a method of hydrolyzing the —SO₂F groups of the fluorinated polymer to salt-form sulfonic acid groups, and forming the salt-form sulfonic acid groups to acid-form thereby to convert them to acid-form sulfonic acid groups, may be mentioned.

A fluorinated polymer having a cyclic structure and having ion exchange groups is suitably used for formation of a catalyst layer or a polymer electrolyte membrane in a membrane/electrode assembly. Further, it is useful also for formation of other membrane (such as a proton permeative membrane to be used for water electrolysis, hydrogen peroxide production, ozone production or waste acid recovery; a cation exchange membrane for electrolysis of sodium chloride; a diaphram for a redox flow cell; or a cation exchange membrane for electrodialysis to be used for desalination or salt production).

According to the above-described method for producing a fluorinated polymer of the present invention, which is a method of distilling the monomer composition of the present invention in which the cyclic monomer and the polymerization inhibitor are easily separated by distillation, to separate the cyclic monomer, and polymerizing a monomer component containing the cyclic monomer, it is possible to obtain a high molecular weight fluorinated polymer.

EXAMPLES

Now, the present invention will be described in further detail with reference to Examples. However, it should be understood that the present invention is by no means restricted to such specific Examples. Ex. 1 to 4 and 12 to 15 are Examples of the present invention, and Ex. 5 to 11 are Comparative Examples.

<Evaluation of Monomer Composition>

Compound (m11-1) was prepared as the compound (m11), and compound (m13-1) was prepared as the compound (m13).

As the polymerization inhibitor, the following were prepared.

Compound (i-1): 2-t-Butyl-1,4-benzoquinone (manufactured by Tokyo Chemical Industry Co., Ltd., reagent)

Compound (i-2): 6-t-Butyl-2,4-xylenol (manufactured by Tokyo Chemical Industry Co., Ltd., reagent)

Compound (i-3): 2,6-di-t-Butyl-p-cresol (manufactured by Tokyo Chemical Industry Co., Ltd., reagent)

Compound (i-4): p-Mentha-1,8-diene (manufactured by Tokyo Chemical Industry Co., Ltd., reagent)

Compound (i'-1): N-Nitrosophenylhydroxylamine aluminum salt (manufactured by Wako Pure Chemical Industries, Ltd., tradename: Q-1301).

Compound (i'-2): 4-t-Butyl-1,2-benzenediol (manufactured by Wako Pure Chemical Industries, Ltd., reagent)

Compound (i'-3): 4-oxo-2,2,6,6-Tetramethylpiperidine-1-oxyl (manufactured by Wako Pure Chemical Industries, Ltd., reagent)

Compound (i'-4): 1,4-Benzoquinone (manufactured by Tokyo Chemical Industry Co., Ltd., reagent)

Compound (i'-5): N-Nitrosophenylhydroxylamine ammonium salt (manufactured by Wako Pure Chemical Industries, Ltd., tradename: Q-1300)

Compound (i'-6): 2-t-Butylanthraquinone (manufactured by Tokyo Chemical Industry Co., Ltd., reagent)

Compound (i'-7): 2,2,6,6-Tetramethylpiperidine-1-oxyl (manufactured by Sigma-Aldrich, reagent)

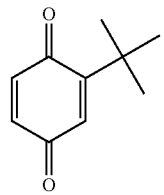

-continued (i-2) 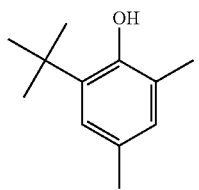

(i-3) 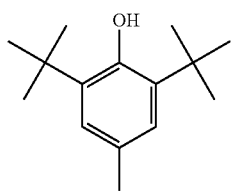

(i-4) 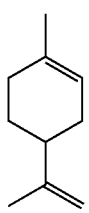

(i'-1) 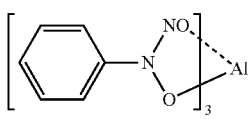

(i'-2) 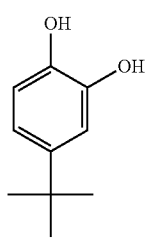

(i'-3) 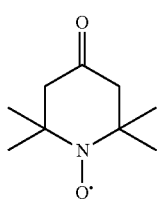

(i'-4) 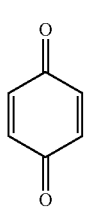

(i'-5) 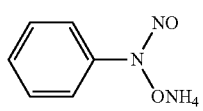

-continued (i'6) 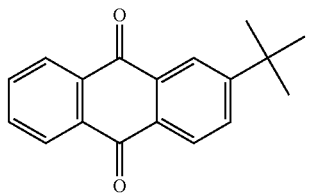

(i'7) 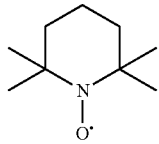

Ex. 1 to 11

0.01 g of each of polymerization inhibitors as identified in Table 1 was added to 10.0 g of compound (m11-1) and well stirred to obtain each of monomer compositions in Ex. 1 to 11.

Ex. 16 to 19

0.01 g of each of polymerization inhibitors as identified in Table 3 was added to 10.0 g of compound (m13-1) and well stirred to obtain each of monomer compositions in Ex. 16 to 19.

(Solubility)

The monomer composition was visually observed to evaluate solubility of the polymerization inhibitor in the monomer based on the following standards. The results are shown in Tables 1 and 2.

◯: The polymerization inhibitor was dissolved in the monomer.

Δ: The polymerization inhibitor was dispersed in the monomer.

x: The polymerization inhibitor was not dissolved or dispersed in the monomer.

(Stability)

The monomer composition was left to stand in a closed container in an air atmosphere at 40° C. for 500 hours. The concentrations of compound (m11-1) or (m13-1) in the monomer composition immediately after leaving and 50 hours after the start of leaving were analyzed by gas chromatography. 0.1 g of AC2000 (manufactured by Asahi Glass Company, Limited, ASAHIKLIN (registered trademark) AC-2000) as an internal standard was added to 10.01 g of the monomer composition, and the mass of compound (m11-1) or (m13-1) based on AC2000 was determined to determine the concentration of compound (m11-1) or (m13-1) in the monomer composition. A ratio of a decrease in the concentration of compound (m11-1) or (m13-1) 50 hours after the start of leaving to the concentration of compound (m11-1) or (m13-1) in the monomer composition immediately after the start of leaving, was calculated. The results are shown in Table 1 or 3. In a case where the monomer composition gelled during the test, the time at which gelling was visually confirmed is shown in Table 1 or 3.

TABLE 1

| Ex. | | 1 | 2 | 3 | 4 | 5 | 6 | 7 | 8 | 9 | 10 | 11 |
|---|---|---|---|---|---|---|---|---|---|---|---|---|
| Polymerization inhibitor | | i-1 | i-2 | i-3 | i-4 | i'-1 | i'-2 | i'-3 | i'-4 | i'-5 | i'-6 | i'-7 |
| Solubility | | ○ | ○ | ○ | ○ | Δ | X | ○ | ○ | X | X | ○ |
| Stability | Concentration decrease ratio [%] | 1 | 5 | 2 | 2 | 2.5 | — | 7.5 | — | — | — | 2 |
| | Gelation [h] | Nil | Nil | Nil | Nil | 500 | 120 | 240 | 300 | 100 | 9 | 147 |

<Production of Fluorinated Polymer>
(TQ Value)

Using a flow tester (manufactured by Shimadzu Corporation, CFT-500D), a temperature at which the extrusion rate of a fluorinated polymer became 100 mm³/sec was obtained as the TQ value.

As the compound (m21), compound (m21-1) containing no polymerization inhibitor was prepared.

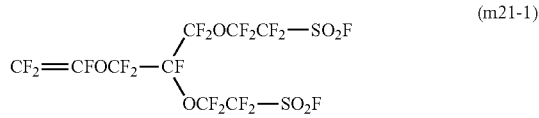

(m21-1)

(Polymerization Initiator)
PFB: $(C_3F_7COO)_2$ (manufactured by NOF CORPORATION, PFB, 10 hours half-life temperature: 21° C.)
(Solvent)
AC2000: $CF_3CF_2CF_2CF_2CF_2CF_2H$
225cb: $CClF_2CF_2CHClF$ Ex. 12

A monomer composition comprising compound (m11-1) and a polymerization inhibitor adjusted in the same proportion as in Ex. 1 was charged in a 100 mL container, the container was connected with a distillation apparatus with a valved connecting tube and freeze-deaerated with liquid nitrogen. The distillation apparatus comprises a distillation column packed with HELI PACK No. 1 to a height of 7 cm and a receiver connected. The distillation column of the distillation apparatus was preliminarily connected to an upper part of the container in which the monomer composition was put, and then freeze-deaeration was conducted. The receiver of the distillation apparatus was cooled with liquid nitrogen, and then the container in which the monomer composition was put was gradually warmed to 15° C. Distillation was conducted by a method of simple distillation with a distillation column, to separate compound (m11-1). The rate of the remaining polymerization inhibitor in the separated compound (m11-1) was analyzed by gas chromatography. Specifically, from areas obtained by gas chromatography, the content (X) of the polymerization inhibitor in the monomer composition and the content (Y) of the polymerization inhibitor in the separated compound (m11-1) were calculated, and the value calculated as Y/X was taken as the proportion of the remaining polymerization inhibitor in the separated compound (m11-1). The proportion of the remaining polymerization inhibitor was 2.1%.

Into a 0.2 L stainless steel autoclave equipped with a jacket and a stirring apparatus, 32.37 g of the compound (m11-1) separated by distillation, 131.83 g of compound (m21-1) and 10.0 g of AC2000 were charged, and vacuum deaeration was conducted twice with liquid nitrogen. The interior of the autoclave was warmed to 24° C., and then 0.1 MPa [gauge] of nitrogen gas was introduced into the autoclave. After confirmation of no change of the pressure, 4.0 g of TFE was charged to the autoclave so that the total pressure would be 0.22 MPa [gauge]. 1.72 g of a solution having PFB dissolved at a concentration of 2.3 mass % in 225cb was added from an addition line connected to the autoclave while being pressurized with nitrogen gas. Then, in order to wash the addition line, 4.52 g of AC2000 was added from the addition line. Polymerization was carried out at an internal temperature of the autoclave of 24° C. at a number of revolutions of 100 rpm. 9.4 Hours after the start of polymerization, the gas in the system was purged and replaced with nitrogen.

The temperature of the jacket was set at 24° C. and the number of stirring revolutions was set at 10 rpm, and the pressure in the autoclave was slowly reduced to 200 kPa [abs] to distil unreacted compound (m11-1), the solvent, etc. from the mixed liquid in the autoclave. The distillate was made to pass through a cooling trap of a mixed liquid of 225cb and dry ice for 2 hours and recovered.

The residue in the autoclave was diluted with 101 g of AC2000 and stirred at a number of revolutions of 50 rpm for 3 hours to obtain a polymer solution.

The polymer solution (25° C.) withdrawn from the autoclave was added to an aggregation medium (20° C.) comprising 430 g of AC2000 and 108 g of methanol to form a fluorinated polymer in the form of particles thereby to obtain a dispersion. After stirring for 30 minutes, 230 g of the dispersion was withdrawn, and 70 g of methanol was added to the polymer particles dispersion, followed by stirring for 30 minutes and filtration to obtain a fluorinated polymer in the form of particles.

Washing comprising adding the fluorinated polymer in the form of particles to a washing medium comprising 60 g of AC2000 and 25 g of methanol, followed by stirring and filtration, was repeated three times.

The fluorinated polymer in the form of particles was vacuum dried at 80° C. for 16 hours and subjected to vacuum heat treatment at 240° C. for 16 hours to obtain 19.82 g of a fluorinated polymer.

The proportion (content) of the respective units in the fluorinated polymer as determined by ¹⁹F-NMR was such that compound (m21-1)/compound (m11-1)/TFE=18/67/15 (molar ratio). The TQ value was 286° C. The results are shown in Table 2.

Ex. 13 to 15

A fluorinated polymer was obtained in the same manner as in Ex. 12 except that the monomer composition, the distillation condition, the polymerization condition, etc. are changed as identified in Table 2. The results are shown in Table 2.

With respect to simple distillation with distillation column in Ex. 13, the distillation column was packed with HELI PACK No. 1 as a filler to a height of 7 cm, and distillation was conducted in the same manner as in the case of simple distillation. In Ex. 13, compound (m11-1) after distillation was analyzed in the same manner as in Ex. 12, whereupon no peak of the polymerization inhibitor was confirmed.

In Ex. 14, in the same manner as in Ex. 12, the proportion of the remaining polymerization inhibitor in compound (m11-1) after distillation was calculated, whereupon it was 1.3%.

With respect to purification distillation in Ex. 15, a distillation column was packed with HELI PACK No. 1 as a filler to a height of 50 cm, and purification distillation was conducted. In Ex. 15, in the same manner as in Ex. 12, compound (m11-1) after distillation was analyzed, whereupon no peak of the polymerization inhibitor was confirmed.

TABLE 2

|  |  |  | Ex. 12 | Ex. 13 | Ex. 14 | Ex. 15 |
|---|---|---|---|---|---|---|
| Distillation | Monomer composition |  | — | Ex. 1 | Ex. 2 | Ex. 2 | Ex. 4 |
|  | Distillation method |  | — | Simple distillation with distillation column | Simple distillation with distillation column | Simple distillation | Purification distillation |
|  | Pressure condition |  | — | Reduced pressure | Reduced pressure | Reduced pressure | Normal pressure |
|  | Temperature | ° C. |  | 15 | 15 | 10 | 37 |
| Polymerization | Autoclave capacity | L |  | 0.2 | 0.2 | 0.2 | 0.2 |
|  | Monomer | TFE | g | 4.01 | 4.04 | 4.17 | 4.12 |
|  |  | (m11-1) | g | 32.37 | 32.38 | 32.37 | 32.7 |
|  |  | (m21-1) | g | 131.83 | 131.89 | 131.85 | 133.13 |
|  | Polymerization initiator solution concentration | mass % |  | 2.3 | 2.5 | 2.5 | 2.7 |
|  | Polymerization initiator solution | g |  | 1.72 | 1.6 | 1.6 | 1.49 |
|  | Polymerization solvent AC2000 | g |  | 14.52 | 15.03 | 15 | 15 |
|  | Polymerization temperature | ° C. |  | 24 | 24 | 24 | 24 |
|  | Polymerization time | hr |  | 9.4 | 9 | 11.5 | 11.5 |
|  | Yield | g |  | 19.82 | 24.78 | 23.63 | 29.04 |
| Proportion of structural units | (m21-1) | mol % |  | 18 | 17 | 16 | 19 |
|  | (m11-1) | mol % |  | 67 | 66 | 68 | 72 |
|  | TFE | mol % |  | 15 | 17 | 16 | 9 |
|  | TQ Value | ° C. |  | 286 | 274 | 287 | 291 |

TABLE 3

|  |  | Ex. | | | |
|---|---|---|---|---|---|
|  |  | 16 | 17 | 18 | 19 |
|  | Polymerization inhibitor | i-1 | i-2 | i-3 | i-4 |
|  | Solubility | ○ | ○ | ○ | ○ |
| Stability | Decrease of purity [%] | 1.5 | 1.5 | 1.7 | 1.0 |
|  | Gelation [h] | Nil | Nil | Nil | Nil |

As evident from Tables 1 and 3, the monomer compositions in Ex. 1 to 4 and 16 to 19, which contained the specific polymerization inhibitor of the present invention, showed favorable stability. Whereas the monomer compositions in Ex. 5 to 11, which contained no specific polymerization inhibitor of the present invention, showed no sufficient stability, and a gel substance was confirmed during the stability test.

Further, as shown in Table 3, in Ex. 12 to 15, the cyclic monomer and the polymerization inhibitor could be sufficiently separated by distillation, and a fluorinated polymer having a high TQ value could be obtained.

INDUSTRIAL APPLICABILITY

The fluorinated polymer obtained by the production method of the present invention is useful as a precursor of an electrolyte material to be used for a catalyst layer or a polymer electrolyte membrane of a membrane/electrode assembly, a cation exchange membrane for electrolysis of sodium chloride, etc.

This application is a continuation of PCT Application No. PCT/JP2017/034770, filed on Sep. 26, 2017, which is based upon and claims the benefit of priority from Japanese Patent Application No. 2016-189905 filed on Sep. 28, 2016. The contents of those applications are incorporated herein by reference in their entireties.

What is claimed is:

1. A monomer composition comprising a cyclic monomer and a polymerization inhibitor, the cyclic monomer being at least one monomer selected from the group consisting of a compound represented by the following formula (m11), a compound represented by the following formula (m12), a compound represented by the following (m13-1), and a compound represented by the following formula (m13-2), and the polymerization inhibitor being a polymerization inhibitor which satisfies the following requirements (a) to (d):

(a) it is a 6-membered unsaturated cyclic hydrocarbon having from 1 to 4 substituents, (b) it has, as the substituent, at least one type selected from the group consisting of a t-butyl group, a methyl group, an isopropenyl group, an oxo group and a hydroxy group, (c) in a case where it has an oxo group as one type of the substituent, it has, as the substituent other than the oxo group, either one or both of a t-butyl group and a methyl group, and (d) in a case where it has a hydroxy group as the substituent, the number of the hydroxy group is only one;

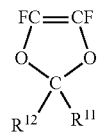

(m11)

-continued

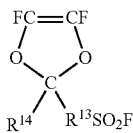
(m12)

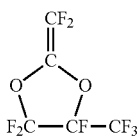
(m13-1)

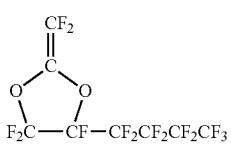
(m13-2)

wherein $R^{11}$, $R^{12}$, and $R^{14}$ are each independently a fluorine atom, a $C_{1-10}$ perfluoroalkyl group or a group having an etheric oxygen atom in a carbon-carbon bond of a $C_{2-10}$ perfluoroalkyl group, and $R^{13}$ is a single bond, a $C_{1-10}$ perfluoroalkylene group or a group having an etheric oxygen atom in a carbon-carbon bond of a $C_{2-10}$ perfluoroalkylene group.

2. The monomer composition according to claim 1, wherein the proportion of the cyclic monomer is from 90 to 99.99 mass % based on the total amount of the monomer composition.

3. The monomer composition according to claim 1, wherein the proportion of the polymerization inhibitor is from 0.01 to 10 mass % based on the total amount of the monomer composition.

4. The monomer composition according to claim 1, wherein the cyclic monomer is the compound represented by the formula (m11) or the compound represented by the formula (m12).

5. The monomer composition according to claim 1, wherein the cyclic monomer is at least the compound represented by the formula (m11) and the compound represented by the formula (m11) is a compound represented by the following formula (m11-1), a compound represented by the following formula (m11-2) or a compound represented by the following formula (m11-3):

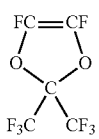
(m11-1)

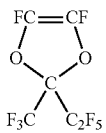
(m11-2)

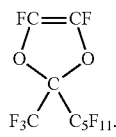
(m11-3)

6. The monomer composition according to claim 1, wherein the cyclic monomer is at least the compound represented by the formula (m12) and the compound represented by the formula (m12) is a compound represented by the following formula (m12-1) or a compound represented by the following formula (m12-2):

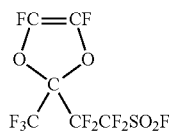
(m12-1)

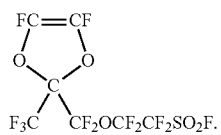
(m12-2)

7. The monomer composition according to claim 1, wherein the cyclic monomer is at least the compound represented by the formula (m13-1).

8. The monomer composition according to claim 1, wherein the polymerization inhibitor is at least one polymerization inhibitor selected from the group consisting of a compound represented by the following formula (i-1), a compound represented by the following formula (i-2), a compound represented by the following formula (i-3) and a compound represented by the following formula (i-4):

(i-1)

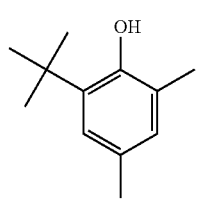
(i-2)

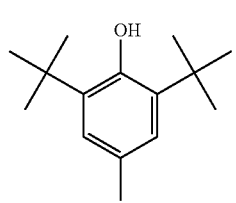
(i-3)

(i-4)

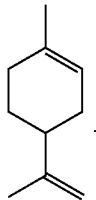

9. The monomer composition according to claim 8, wherein the polymerization inhibitor is at least one polymerization inhibitor selected from the group consisting of the compound represented by the formula (i-1), the compound represented by the formula (i-2) and the compound represented by the formula (i-3).

10. A method for producing a fluorinated polymer, which comprises distilling the monomer composition as defined in claim 1 to separate the cyclic monomer, and polymerizing a monomer component containing the cyclic monomer.

11. The method for producing a fluorinated polymer according to claim 10, wherein the monomer composition is distilled by simple distillation, simple distillation with packed column, or purification distillation.

12. The method for producing a fluorinated polymer according to claim 10, wherein the fluorinated polymer is an electrolyte material to be contained in a polymer electrolyte membrane or a catalyst layer of a membrane/electrode assembly for a polymer electrolyte fuel cell.

13. The monomer composition according to claim 1, wherein the cyclic monomer is at least the compound represented by the formula (m13-2).

* * * * *